United States Patent
Himmel et al.

(10) Patent No.: US 6,279,036 B1
(45) Date of Patent: *Aug. 21, 2001

(54) METHOD AND APPARATUS FOR DETECTING ACTUAL VIEWING OR ELECTRONIC ADVERTISEMENTS

(75) Inventors: Maria Azua Himmel; Viktors Berstis, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/080,162

(22) Filed: May 15, 1998

(51) Int. Cl.[7] ........................................ G06F 11/30
(52) U.S. Cl. ................................. 709/224; 705/14
(58) Field of Search .................... 709/217, 218, 709/219, 224; 705/14

(56) References Cited

U.S. PATENT DOCUMENTS

| 5,710,884 | * | 1/1998 | Dedrick | 709/217 |
|---|---|---|---|---|
| 5,754,787 | * | 5/1998 | Dedrick | 709/228 |
| 5,768,521 | * | 6/1998 | Dedrick | 709/224 |
| 5,809,242 | * | 9/1998 | Shaw et al. | 709/217 |
| 5,823,879 | * | 10/1998 | Goldberg et al. | 463/42 |
| 5,848,396 | * | 12/1998 | Gerace | 705/10 |
| 5,848,397 | * | 12/1998 | Marsh et al. | 705/14 |
| 5,966,696 | * | 10/1999 | Giraud | 705/14 |
| 5,991,735 | * | 11/1999 | Gerace | 705/10 |
| 6,009,409 | * | 12/1999 | Adler et al. | 705/14 |
| 6,016,509 | * | 1/2000 | Dedrick | 709/224 |
| 6,108,637 | * | 8/2000 | Blumenau | 705/7 |
| 6,119,098 | * | 9/2000 | Guyot et al. | 705/14 |

\* cited by examiner

Primary Examiner—Kenneth R. Coulter
(74) Attorney, Agent, or Firm—Richard A. Henkler; Andrea Pair Bryant; Leslie A. Van Leeuwen

(57) ABSTRACT

An apparatus and method for determining rates chargeable to advertisers based upon the actual viewing time for which their advertisements were seen by a given user. This is accomplished through the use of a advertisement control plug in combination with a file used during times in which the user is not connected to the Internet or other applicable network.

16 Claims, 8 Drawing Sheets

METHOD AND APPARATUS FOR DETECTING ACTUAL VIEWING OR ELECTRONIC ADVERTISEMENTS

CROSS-REFERENCE TO RELATED APPLICATION

The present patent application is related to Ser. No. 08/080,023, now allowed, entitled "METHOD AND APPARATUS FOR DETECTING ACTUAL VIEWING OF ELECTRONIC ADVERTISEMENTS" which is hereby incorporated by reference herein.

The present patent application is related to Ser. No. 09/080,021, entitled "METHOD AND APPARATUS FOR DETECTING ACTUAL VIEWING OF ELECTRONIC ADVERTISEMENTS AND TRANSMITTING THE DETECTED INFORMATION" which is hereby incorporated by reference herein.

The present patent application is related to Ser. No. 09/080,018, entitled "METHOD AND APPARATUS FOR DYNAMICALLY ALTERING THE CONTENTS OF ELECTRONICALLY DISPLAYED INFORMATION BASED UPON A USER PROFILE" which is hereby incorporated by reference herein.

BACKGROUND

1. Field of the Present Invention

The present invention generally relates to computer systems, and more particularly, to methods and apparatuses which detect the use and viewing of electronic advertising means such as web (HTML) pages, Applets or the like.

2. Description of the Related Art

The development of computerized distributed information resources, such as the "Internet", allows users to link with servers and networks, and retrieve vast amounts of electronic information that was previously unavailable using conventional electronic mediums. Such electronic information increasingly is displacing more conventional techniques of information transmission, such as newspapers, magazines, and even television.

The term "Internet" is an abbreviation for "Inter network", and refers commonly to a collection of computer networks that use the TCP/IP suite of protocols. TCP/IP is an acronym for "Transport Control Protocol/Interface Program", a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user.

For example, traveling among hypertext links to the word "iron" in an article displayed within a graphical user interface might lead the user to the periodic table of the chemical elements (e.g., linked by the word "iron"), or to a reference to the use of iron in weapons in Europe in the Dark Ages. The term "hypertext" is used to describe documents, as presented by a computer, that express the non-lineal structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics, rather than moving sequentially from one topic to the next, as in an alphabetic list. In other words, hypertext topics are linked in a manner that allows users to jump from one subject to other related subjects during a search for information.

Networked systems using hypertext conventions typically follow a client/server architecture. A "client" is a member of a class or group that uses the services of another class or group to which it is not related. In the context of a computer network, such as the Internet, a client is a process (i.e., roughly a program or task) that requests a service which is provided by another program. The client process uses the requested service without having to "know" any working details about the other program or the service itself. In networked systems, a client is usually a computer that accesses shared network resources provided by another computer (i.e., a server).

A "server" is typically a remote computer system which is accessible over a communications medium such as the Internet. The server scans and searches for raw (e.g., unprocessed) information sources (e.g., news wire feeds or news groups). Based upon such requests by the user, the server presents filtered electronic information to the user as server responses to the client process. The client process may be active in a second computer system, and communicate with one another over a communications medium that allows multiple clients to take advantage of the information-gathering capabilities of the server.

Clients and servers communicate with one another using the functionality provided by a HyperText Transfer Protocol (HTTP), or other interactive protocol (e.g. COBRA, or IIOP), or secure links (e.g. HTTPS). The World Wide Web (WWW) or, simply, the "web," includes all servers adhering to this protocol, which are accessible to clients via a Universal Resource Location (URL). Internet services can be accessed by specifying Universal Resource Locators that have two basic components: a protocol to be used and an object path name. For example, the Universal Resource Locator address, "http://www.uspto.gov" (i.e., the "home page" for the U.S. Patent and Trademark Office), specifies a hypertext transfer protocol ("http") and a path name of the server ("www.uspto.gov").

The server name is associated with a unique numeric value (TCP/IP address). Active within the client is a first process, known as a "browser", that establishes the connection with the server, and presents information to the user. The server itself executes corresponding server software that presents information to the client in the form of HTTP responses. The HTTP responses correspond to "web pages" constructed from a Hypertext Markup Language (HTML), Dynamic HTML, Java Applets, or other server-generated data.

A "web page", as used hereinafter, defines a viewing area that can be manipulated by the end user, such that the contents may not be seen in their entirety. As defined, a web page may be, for example, a data file written in a hypertext language that may have text, graphic images, and even multimedia objects such as sound recordings or move video clips associated with that data file. The web page can be displayed as a viewable object (e.g. a window) within a computer system. A viewable object can contain one or more components such as spreadsheets, text, hot links, pictures, sound, and video objects. A web page can be constructed by loading one or more separate files into an active directory or file structure that is then displayed as a viewable object within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "largeri" than the physical size of the monitor screen, and devices such as graphical user interface scroll bars can be utilized by the viewing software (i.e., the browser) to view different portions of the web page.

Most text displayed by a web browser is formatted using standard HTML. An HTML file is a text file that contains both the text to be displayed and markup tags that describe how the text should be formatted by the web browser. The HTML markup tags support basic text formatting, such as paragraph breaks, bullet lists, tables, graphs, charts, and so forth. In addition to these basic text formatting tags, HTML provides tags defining graphical user interface components. HTML also can be used to display well known graphical user interface components such as radio buttons, check boxes, scrolling lists of selectable text, and various other such components at the web browser itself.

As the Internet has increased in popularity, the number of users and the amount of time they spend using the Internet has increased proportionately, thus, allowing a new field for exploiting various products via the means of advertising.

Advertisers are now able to embed their advertisements on web pages and Java Applets in a fashion similar to that of billboards or other type media where they would expect a user interested in that type of product to normally visit. In contrast to prior media, however, the Internet has provided the user with the ability to control not only the type of content that they desire to view, but whether or not entire portions of the content will be viewed (e.g. only viewing the text portions of a web page, excluding the image or advertising portions).

Consequently, today advertisers are charged a flat rate for space on web pages. Unfortunately, since the user is able to direct what content they wish to see, and whether the entire content will be viewed, certain advertisements on a web page may not even be seen by a given user.

It would, therefore, be a distinct advantage to have a method and apparatus that would allow varying rates to be charged to the advertisers for placing their advertisements on a web page based upon whether or not these advertisement are actually seen by the user, and for the amount of time for which the advertisement was viewed. The present invention provides such a method and apparatus.

SUMMARY OF THE PRESENT INVENTION

The present invention is an apparatus and method for determining rates chargeable to advertisers based upon the actual viewing time for which their advertisements were seen by a given user. This is accomplished through the use of an advertisement control plug in combination with a file used during times in which the user is not connected to the Internet or other applicable network.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details.

Figure 1:
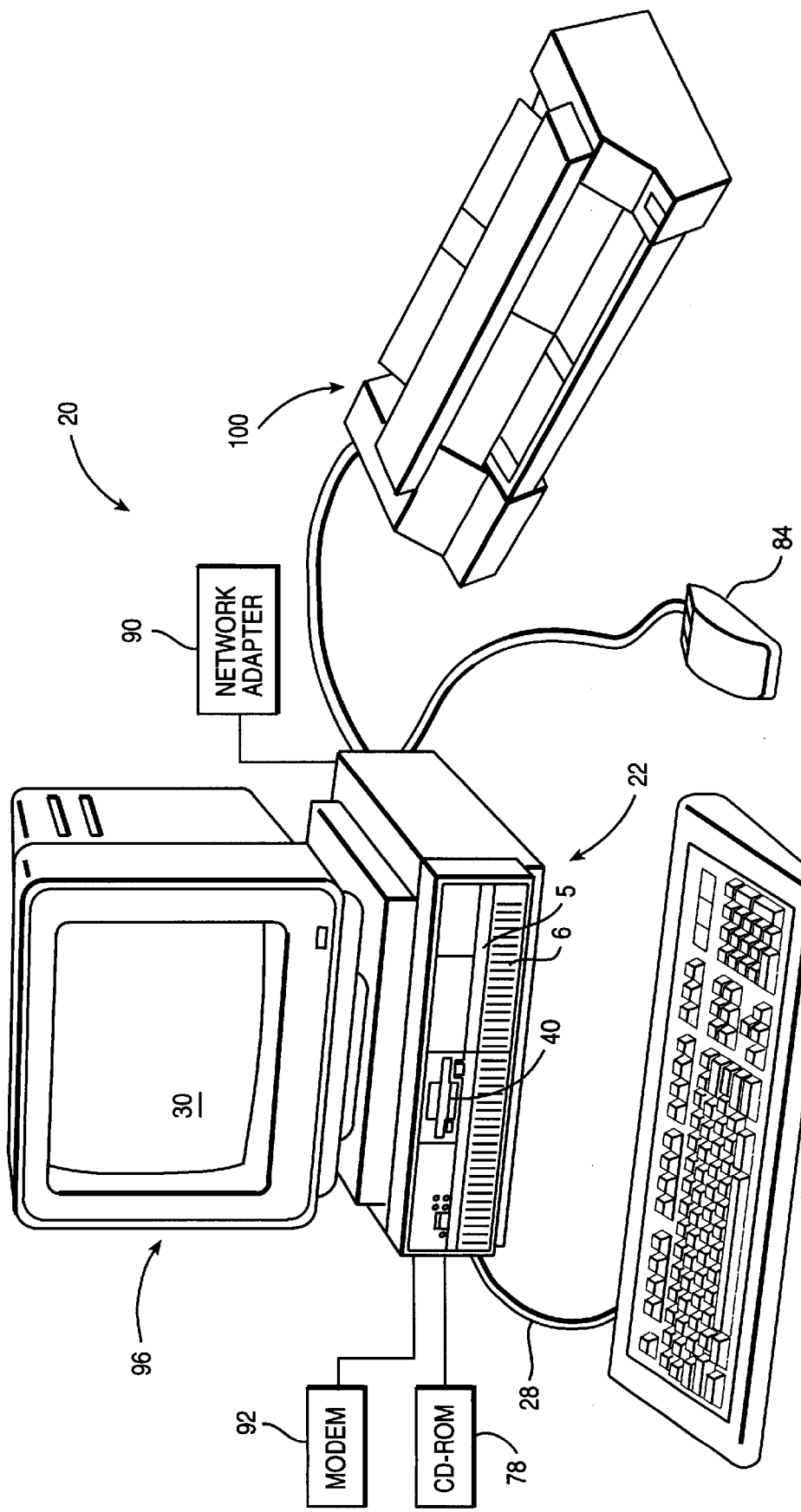
FIG. 1 is a diagram of a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
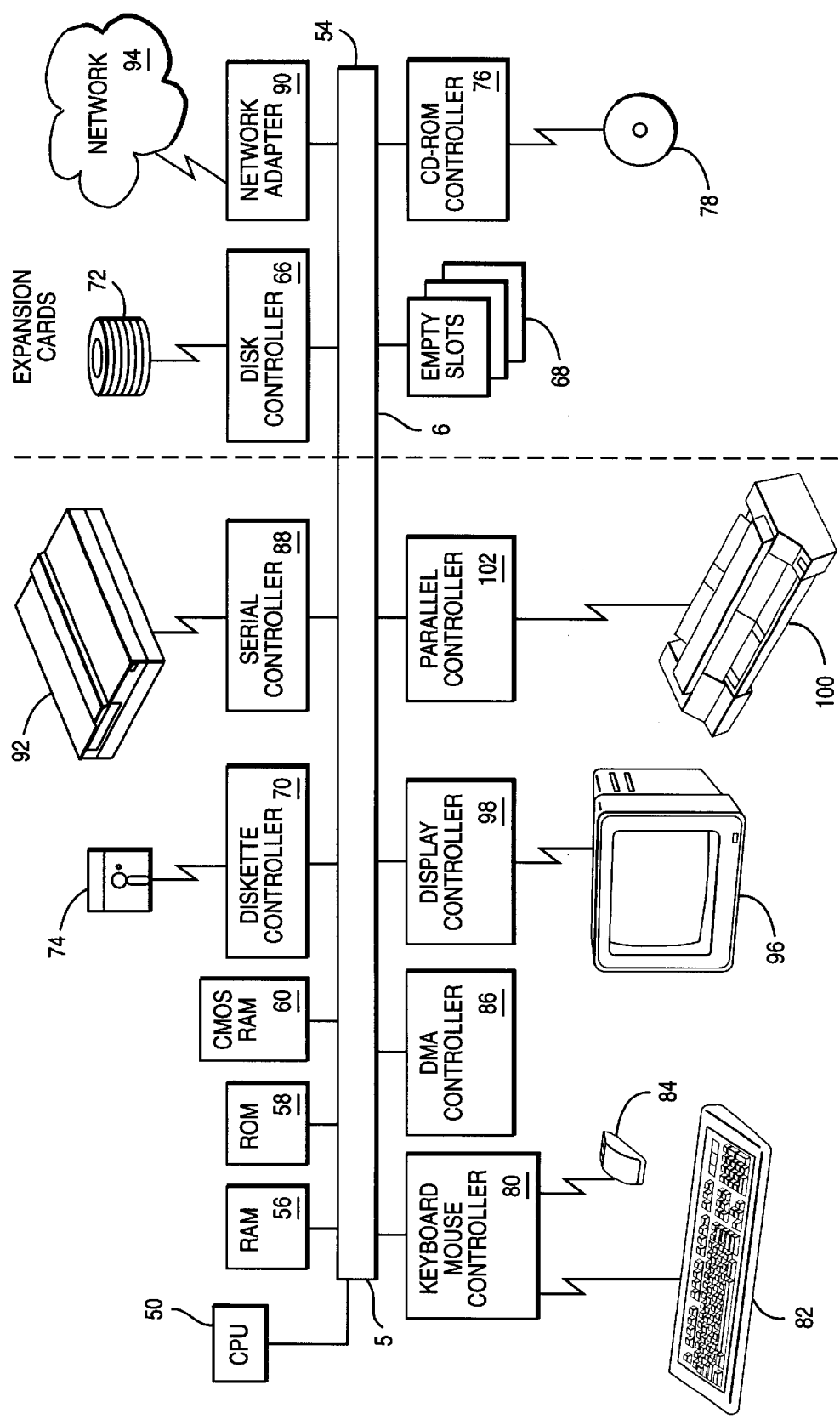
FIG. 2 in a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not loose data when power is removed from it. Nonvolatile memories include ROM, EPROM, flash memory, or battery-pack CMOS RAM. As shown in FIG. 2, such battery-pack CMOS RAM may be used to store configuration information. An expansion card or board is a circuit board that includes chips and other electronic components connected that adds functions or resources to the computer. Typically expansion cards add memory, disk-drive controllers 66, video support, parallel and serial ports, and internal modems. For lop top palm top, and other portable computers, expansion cards usually take the form of PC cards, which are credit card-sized devices designed to plug into a slot in the side or back of a computer. An example such a slot is PCMCIA slot (Personal computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the track ball, the track pad, and the pointing device sold under the trademark "Track Point" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines, Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of splinters may include an image setter, a plotter, or a film recorder.

Parallel controller 102 is used to send multiple data and control bits simultaneously over wires connected between system bus 5 and another parallel communication device, such as plinter 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
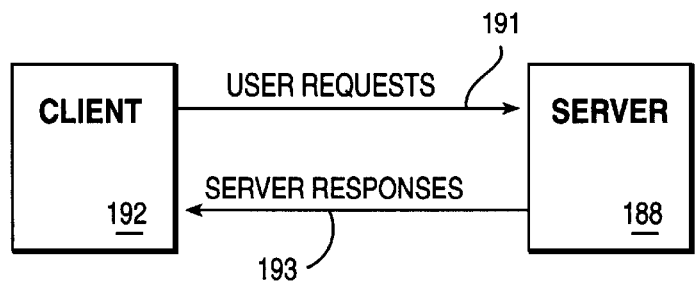
FIG. 3 illustrates a block diagram illustrative of a client/server architecture in accordance with a preferred embodiment of the present invention.

Reference now being made to FIG. 3, a block diagram is shown illustrating a client/server architecture for which the computer system 20 of FIG. 1 can be used as the client 192 in accordance with a preferred embodiment of the present invention. In FIG. 3, user requests 191 for news are sent by a client 192 to a server 188. Server 188 can be a remote computer system accessible over the Internet or other communication networks.

Server 188 can perform the function of scanning and searching of raw (e.g., unprocessed) information sources (e.g., news wire feeds or news groups) via a server process and, based upon these user requests, present the filtered electronic information as server responses 193 to the client 192 via a client process (not shown). The client process may be active in a first computer system, and the server process may be active in a second computer system, communicating with one another over a communications medium, thus providing distributed functionality and allowing multiple clients to take advantage of the information-gathering capabilities of the server 188.

Figure 4:
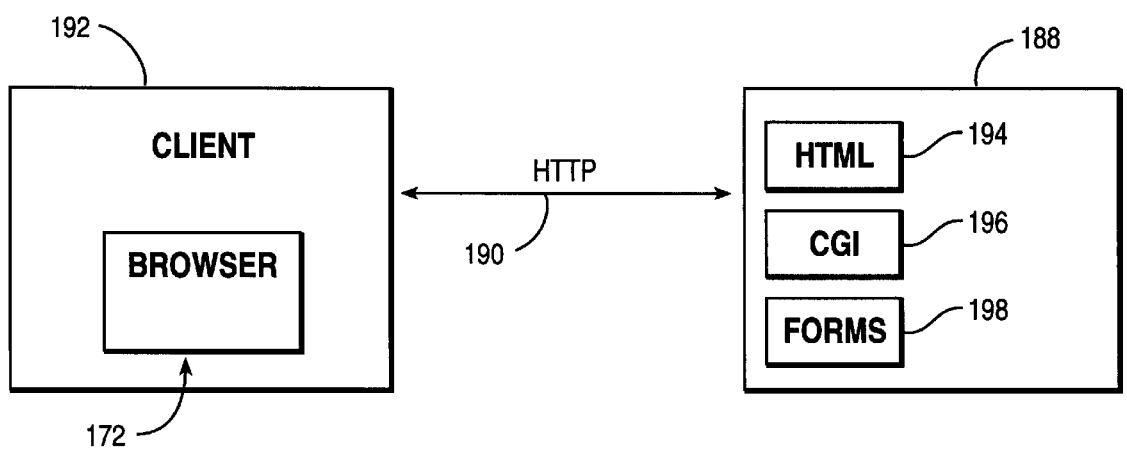
FIG. 4 depicts a detailed block diagram of a client/server architecture in accordance with a preferred embodiment of the present invention.

Reference now being made to FIG. 4, a detailed block diagram is shown of the client/server architecture of FIG. 3 in accordance with a preferred embodiment of the present invention.

Client 192 and server 188 communicate by using the functionality provided by the HTTP protocol. Active within client 192 is a browser 172, which can be described in general as a means for establishing connections with server 188, and presenting information to the user. Any number of commercially or publicly available browsers can be used in various implementations in accordance with the preferred embodiment of the present invention. For example, a browser such as Netscape™ can be used in accordance with a preferred embodiment of the present invention to provide the functionality specified under HTTP. "Netscape" is a trademark of Netscape, Inc.

Server 188 executes the corresponding server software, which presents information to the client 192 in the form of HTTP responses 190. The HTTP responses 190 correspond with the web pages represented using HTML, or other data generated by server 188. Server 188 provides HTML 194.

Under certain browsers, a Common Gateway Interface (CGI) 196 is also provided, which allows the client program to direct server 188 to commence execution of a specified program contained within server 188. This may include a search engine that scans received information in the server 188 for presentation to the user controlling the client 192. Using this interface, and HTTP responses 190, the server 188 can notify the client 192 of the results of that execution upon completion.

Common Gateway Interface (CGI) 196 is one form of a gateway, a device used to connect dissimilar networks (i.e., networks using different communications protocols) so that electronic information can be passed from one network to the other. Gate ways transfer electronic information, converting such information to a form compatible with the protocols used by the second network for transport and delivery.

In order to control the parameters of the execution of this server present process, the client 192 may direct the filling out of certain "forms" from the browser. This is provided by the "fill-in-forms" functionality (i.e., forms 198), which is provided by some browsers. This functionality allows the user via a client application program to specify terms in which the server 188 causes an application program to function (e.g., terms or keywords contained in the types of stories/articles which are of interest to the user). This functionality is an integral part of the search engine.

Figure 5:
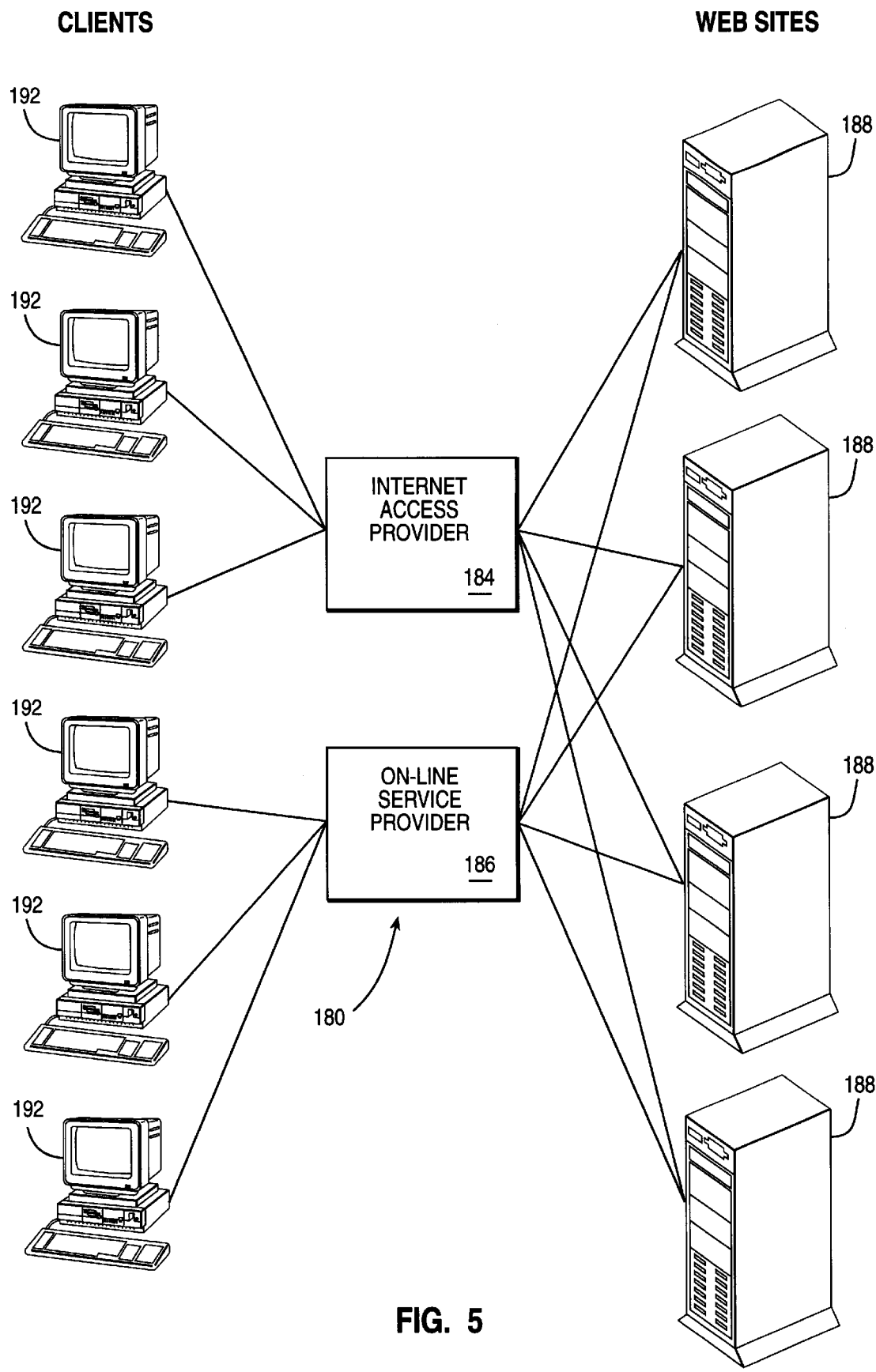
FIG. 5 is a diagram illustrative of a computer network which can be implemented in accordance with a preferred embodiment of the present invention.

Reference now being made to FIG. 5, a diagram is shown illustrating a computer network 180 having a plurality of clients 192 and servers 188 of FIG. 4 in accordance with a preferred embodiment of the present invention. Computer network 180 is representative of the Internet, which can be described as a known computer network based on the client-server model discussed previously. Of course, those skilled in the art will appreciate that the Internet is not the only distributed computer network that may be used in accordance with a preferred embodiment of the present invention. Other distributed computer networks such as the so-called "intranets" will known in the art of computer networking can also be used to implement computer network 180.

Conceptually, the Internet includes a large network of servers 188 that are accessible by clients 192, typically users of personal computers, through some private Internet access provider 184 (e.g., such as Internet America) or an on-line service provide 86 (e.g., such as America On-Line, Prodigy, CompuServe, and the like). Each of the clients 192 may run a browser to access servers 188 via the access providers. Each server 188 operates a so-called "web site" that supports files in the form of documents and pages. A network path to servers 188 is identified by a Universal Resource Locator having a known syntax for defining a network collection.

Figure 6:
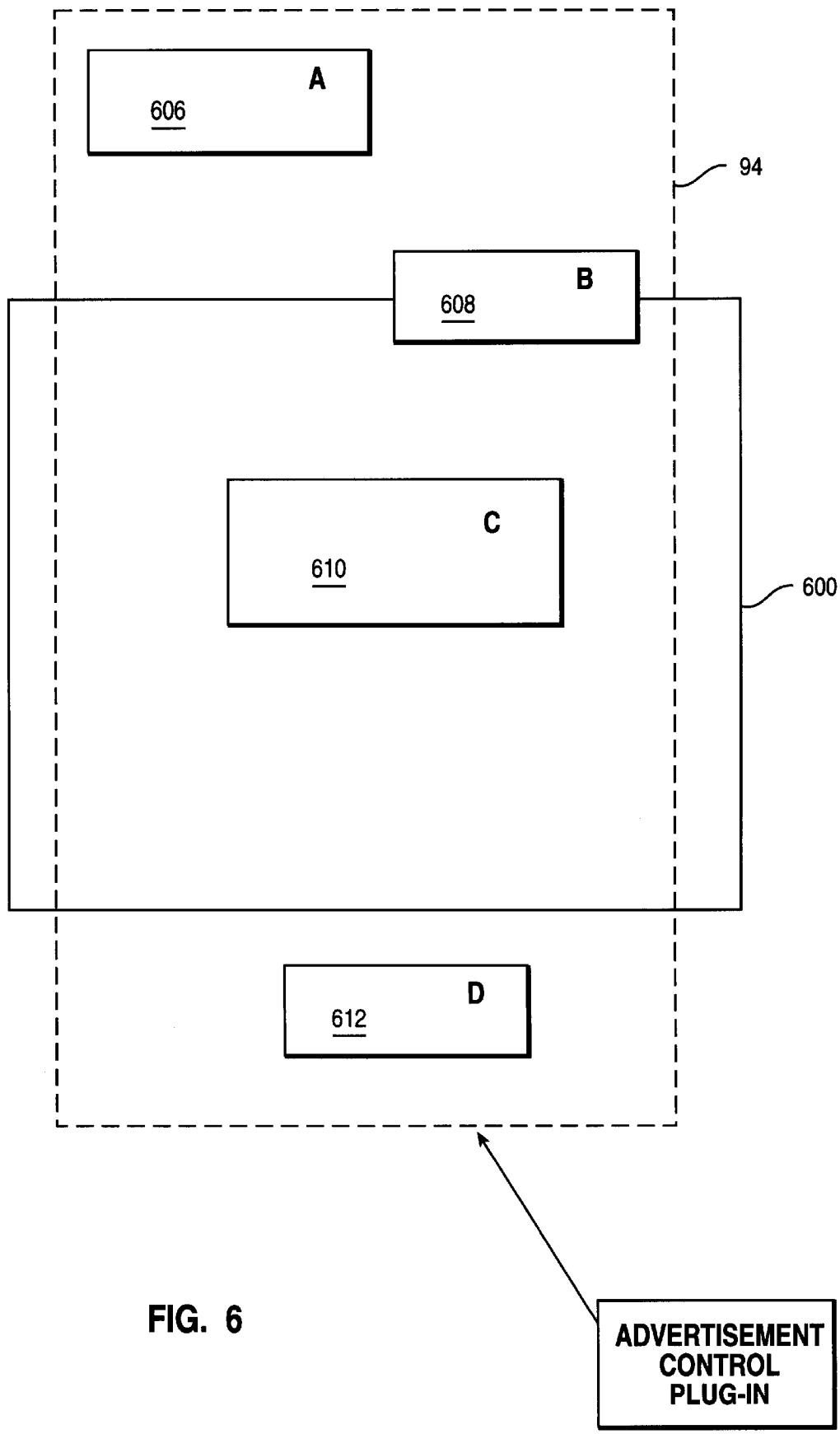
FIG. 6 is a diagram illustrating a Browser executing the HTML document (web page) of FIG. 4 in accordance with the teachings of the present invention.

Reference now being made to FIG. 6, a diagram is shown illustrating a Browser 600 executing the HTML document (web page) 194 of FIG. 4 in accordance with the teachings of the present invention. Browser 600 can be any commercially available web browser (e.g. Netscape Navigator™ or Internet Explorer™). In the preferred embodiment of the present invention, Browser 600 operates in a window type environment, and consequently includes all the functionality provided from such environment, such as vertical and horizontal scroll bars, menus, etc . . . (not shown).

As illustrated in FIG. 6, Web Browser 600 has loaded the HITML page 194 as previously discussed in connection with FIGS. 4–5. The web page 194 includes advertising elements A-D 606-612. Each of the advertising elements A-D 606-612 represent an image and /or text for displaying an advertisement to the user.

During the downloading of web page 194, the user is given the option to download a plugin (Advertisement Control PlugIn 604 ) which supports time tracking for advertisements. Once installed, the Advertisement Control PlugIn 604 controls the movement and functionality of the web page 194, and tracks the time intervals for which each of the advertisements A-D 606-612 is viewable as explained greater detail in connection with FIG. 7. Those skilled in the ait will readily recognize and fully understand that a Java Application could also be used to perform the same functionality of the Advertisement Control PlugIn 604. In addition, those skilled in the art will also recognize that the Advertisement Control PlugIn 604 could be incorporated into the functionality of a web browser. Therefore, the present invention is equally applicable to either such alternative implementations.

Figure 7:
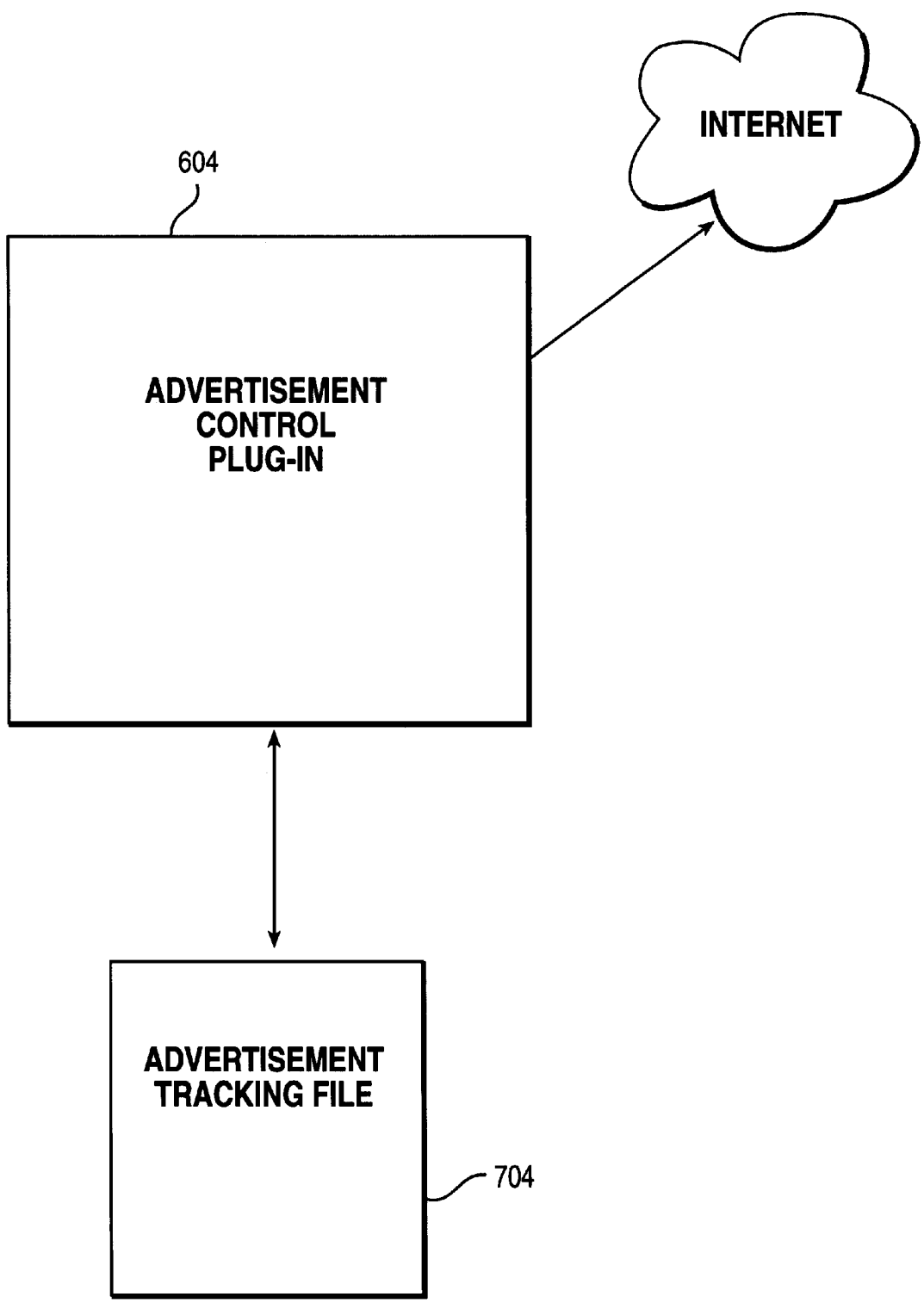
FIG. 7 is a diagram illustrating in greater detail the advertisement control plugin of FIG. 6 according to the teachings of the present invention.

Reference now being made to FIG. 7, a diagram is shown illustrating in greater detail the Advertisement Control PlugIn 604 of FIG. 6 according to the teachings of the present invention. The Advertisement Control PlugIn 604 detects when an advertisement A-D 606-612 is viewable. The term viewable, as used hereinafter, is used to define when a particular advertisement is completely or identifiably (i.e. partially but not completely) seen by the end user. The paiticular method or statistics used for such determination are most likely to be negotiated between the parties, and therefore, definable based upon these negotiations. Consequently, it will be assumed for the remainder of this discussion that an advertisement A-D 606-612 is viewable only when the entire advertisement A-D 606-612 is completely viewable within the display area of the Browser 600.

The Advertisement Control Plugfn 604 detects when an advertisement A-D 606-612 becomes viewable within the display area of web Browser 600, and begins to time the viewable event. If the viewable event exceeds a pre-selected time interval, and the user is still connected to the Internet, the Advertisement Control PlugIn 604 transmits the time interval and other relevant information to the corresponding server using well known and understood techniques (e.g. the CGI protocol).

If, however, the user is not connected to the Internet (i.e. they are viewing the web page via the cache of the web browser), then the Advertisement Control PlugIn 604 records the time interval in a file such as Advertisement Tracking File 704. The particular layout and format of the Advertisement Tracking File 704 is designer dependent, but at a minimum must contain, the URL of the server for the web page, and the cumulative time for which a particular advertisement was visible.

Regardless of whether the user is connected to the Internet or viewing from the browser cache, the Advertisement Control PlugIn 604 also determines when a particular advertisement A-D 606-612 has been viewable for a pre-selected interval of time which is indicative of instances in which the user loads a particular web page and leaves the computer system unattended (i.e. a time out) and excludes such periods from being recorded as viewable for any particular visible advertisement A-D 606-612.

Figure 8A:
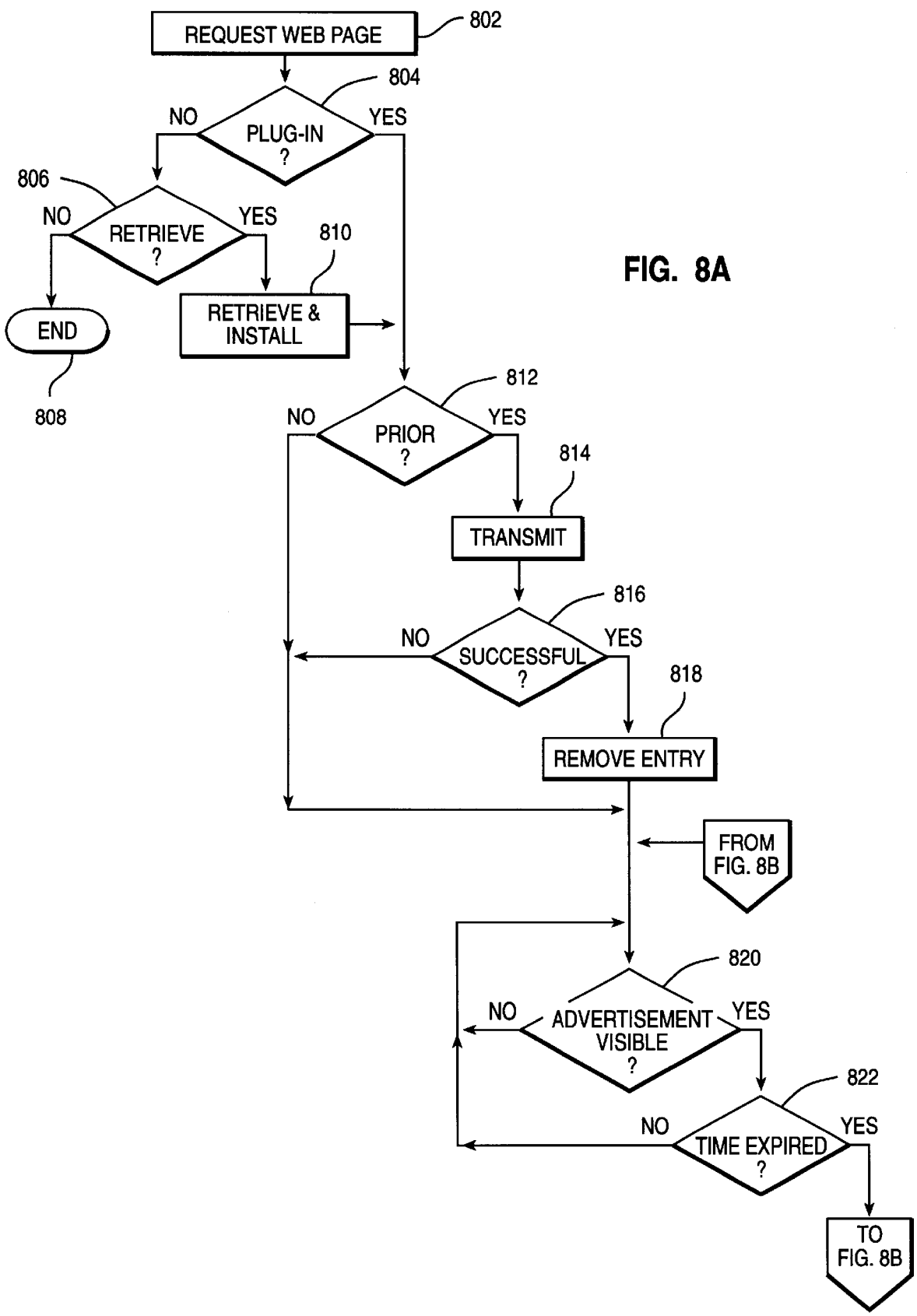
FIGS. 8A–B are a flow chart illustrating the recording and transmission of advertising information using the Advertisement Control PlugIn of FIG. 7 according to the teachings of the present invention.
Figure 8B:
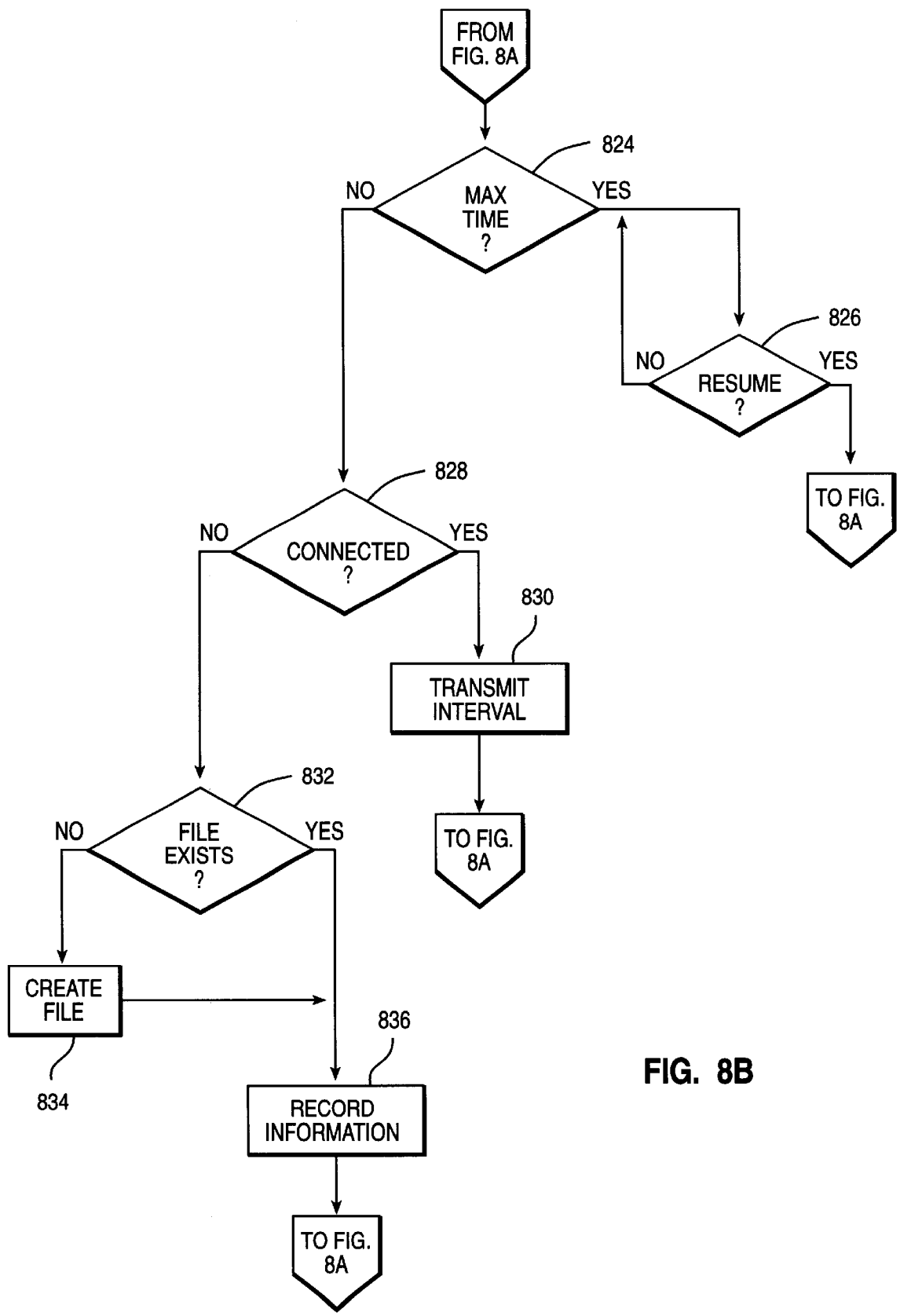

Reference now being made to FIGS. 8A–B, a flow chart is shown illustrating the recording and transmission of advertising information using the Advertisement Control PlugIn 604 of FIG. 7 according to the teachings of the present invention. For illustration and discussion purposes only, it can be assumed that the requested web page is web page 194 and the visible advertisement is advertisement 606.

The method begins upon the user requesting a web page 194 via a URL (Step 802). Once the server 188 corresponding to the web page is located, the web page 194 is downloaded, and it is determined whether or not the user has previously installed the Advertisement Control PlugIn 604 (Step 804). If the user has not previously installed the Advertisement Control PlugIn 604, then the user is given the option to install the Advertisement Control PlugIn 604 (Step 806). If the user selects the option to install, then the Advertisement Control PlugIn 604 is retrieved and installed using well known and understood techniques (Step 810). If, however, the user fails to install the Advertisement Control PlugIn 604, then the method proceeds to end (Step 808).

Once the web page 194 has been downloaded, the Advertisement Control PlugIn 604 is used for displaying the web page 194 and processing any functional movement therewith. In addition, the Advertisement Control PlugIn 604 searches for the existence of any prior recordings of advertisement information which has not been transmitted to the responsible server via the Advertisement Tracking File 704, if it exists (Step 812).

If the Advertisement Control PlugIn 604 locates any prior advertising information, then the information is transmitted to the specified server 188 (via the URL information contained in the cookie 712) using well known and understood techniques for establishing communication with the specified server 188, and transmission of such information (Step 814). It should be noted, however, that in an alternative embodiment, the server 188 containing the initially requested web page 194 could forward the advertising information to each of the responsible servers 188. Any prior recorded advertising infotmation which was successfully transmitted is deleted from Advertisement Tracking File 704 (Step 816 and 818).

Once the Advertisement Control PlugIn 604 detects that an advertisement A 606 has become visible (Step 82), the Advertisement Control PlugIn 604 begins to track the time during which the advertisement A 606 is visible. If the visible event exceeds a pre-selected time interval (Step 822), then the Advertisement Control PlugIn 604 deteimines whether the total time for which the advertisement A 606 including the visible event exceeds the inactivity time out period (step 824). If the total visible time exceeds the time out period, then the Advertisement Control PlugIn 604 proceeds to cease the timing of visible events, until the user resumes their viewing activity at which point the method proceeds from that point (Step 820).

If the total visible time does not exceed the time out period, then the Advertisement Control PlugIn 604 determines whether it is still connected to the Internet or other applicable network (Step 828). If the connection is still present, then the visible time, and any o ther additional information required, for which the advertisement A 606 was present is sent to the responsible server 188 (Step 830).

If, however, the connection is no longer present (i.e. the user is viewing the page 194 via the cache of the web browser), then the Advertisement Control PlugIn 604 must record the advertising information in the Advertisement Tracking File 704. In order to perform the above noted task, the Advertisement Control PlugIn 604 must first determine whether either the Advertisement Tracking File 704 exists (Step 832). If the Advertisement Tracking File 704 does not exist, then it is created (Step 834), and the advertising information recorded (Step 836). If, however, the Advertisement Tracking File does exist, then the advertising information is either added to a new entry, or cumulatively added to an existing entry, representing the advertisement A 606.

Although an illustrative embodiment of the present inventions and their advantages have been described in detail herein above, it has been described as example and not as limitation. Various changes, substitutions and/or alterations can be made in the illustrative embodiment without departing from the breadth, scope and spirit of the present inventions. The breadth, scope and spirit of the present inventions should not be limited by the illustrative embodiment, but should be defined only in accordance with the following claims and equivalents thereof.

What is claimed is:

1. In a computer environment where textual and graphical information are viewed in a web browser window by an end user, the window capable of displaying information having a physical size greater than the physical dimensions of the window, a method of detecting and recording time periods during which certain portions of the information are viewable by the user, the method comprising the steps of:

detecting when a predefined portion of the information is displayed within the physical dimensions of the window; and recording in predefined time intervals the detection of the displayed information.

2. The method of claim 1 wherein the portion of information is an advertisement.

3. The method of claim 2 wherein the steps of detecting and recording are performed by a control module adapted to perform extended functionality for the web browser.

4. The method of claim 2 wherein the step of recording includes the step of: transmitting the predefined intervals to a remotely located computer.

5. The method of claim 4 further comprising the step of: receiving the textual and graphical information from a remotely located computer.

6. The method of claim 5 wherein the step of transmitting includes the step of:

transmitting the predefined intervals to the remotely located computer from which the information was received.

7. The method of claim 5 wherein the step of transmitting includes the step of:

transmitting the predefined intervals to a remotely located computer which is different from the remotely located computer from which the information was received.

8. The method of claim 6 wherein the predefined portion is one hundred percent of the information.

9. The method of claim 8 wherein the web browser is no longer in communication with the remotely located computer from which the information was received, and the step of recording includes:

recording in predefined time intervals the detection of the information to a file located in the computer environment.

10. The method of claim 9 further comprising the step of:

transmitting, once communication from the web browser is established with a remotely located computer, the recorded information from the file to the remotely located computer.

11. The method of claim 10 wherein the step of recording includes the step of:

recording, only if the information has not been displayed longer than a predefined maximum period of time, the detection of the displayed information in predefined time intervals.

12. The method of claim 11 wherein the information is an advertisement.

13. In a computer environment where textual and graphical information are viewed in a web browser window by an end user, the window capable of displaying information having a physical size greater than the physical dimensions of the window, an apparatus for detecting and recording the period of time for which certain advertising portions of the information are viewable by the user, the apparatus comprising:

means for detecting when a predefined portion of the information is displayed within the physical dimensions of the window; and means for recording in predefined time intervals the detection of the displayed information.

14. A computer program product comprising:

a computer readable usable medium having computer readable program code means embodied in the medium for detecting and recording the period of time for which certain portions of textual and/or graphical information are viewable in a browser window by an end user, the computer readable program code means including:

means for detecting predefined portion of the information is displayed within the physical dimensions of the window;

means for recording in predefined time intervals the detection of the displayed information;

means operable while the user is connected to the Internet for is transmitting the predetermined intervals to a remotely located computer; and means operable while the user is not connected to the Internet for locally storing the predetermined intervals for subsequent transmission to said remotely located computer.

15. The computer program product of claim 14 wherein the portion of information is an advertisement.

16. The computer program product of claim 15 wherein the window being viewed by the user is a window which receives and transmits information from and to remotely located computers.

* * * * *